(12) United States Patent
Tan et al.

(10) Patent No.: US 10,876,439 B2
(45) Date of Patent: Dec. 29, 2020

(54) INTERNAL COMBUSTION ENGINE, LUBRICATION SYSTEM, AND ENGINE OIL STRAINER

(71) Applicant: WEICHAI POWER CO., LTD., Shandong (CN)

(72) Inventors: Xuguang Tan, Shandong (CN); Jiawei Shen, Shandong (CN); Yong Cui, Shandong (CN); Jingpeng Cui, Shandong (CN); Jianwen Li, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 16/316,833

(22) PCT Filed: Nov. 18, 2016

(86) PCT No.: PCT/CN2016/106359
§ 371 (c)(1),
(2) Date: Jan. 10, 2019

(87) PCT Pub. No.: WO2018/032641
PCT Pub. Date: Feb. 22, 2018

(65) Prior Publication Data
US 2020/0182109 A1 Jun. 11, 2020

(30) Foreign Application Priority Data

Aug. 15, 2016 (CN) .......................... 2016 1 0674143

(51) Int. Cl.
*F01M 1/10* (2006.01)
*B01D 27/10* (2006.01)
(Continued)

(52) U.S. Cl.
CPC ............. *F01M 1/10* (2013.01); *B01D 27/103* (2013.01); *F01M 1/02* (2013.01); *F01M 11/03* (2013.01);
(Continued)

(58) Field of Classification Search
CPC . F01M 1/10; F01M 1/02; F01M 11/03; F01M 11/0458; F01M 2001/0292; F01M 2001/1078; B01D 27/103
See application file for complete search history.

(56) References Cited

U.S. PATENT DOCUMENTS 3,109,514 A * 11/1963 Deflandre ............. F16C 29/025
184/5
4,621,987 A * 11/1986 Spingath, Jr. ......... F04B 53/126
417/313
(Continued)

FOREIGN PATENT DOCUMENTS

CN 200955449 Y 10/2007
CN 202202916 U 4/2012
(Continued)

OTHER PUBLICATIONS

Russian First Office Action corresponding to Application No. 2019101796; dated Sep. 16, 2019.
(Continued)

*Primary Examiner* — Jacob M Amick
*Assistant Examiner* — Charles Brauch
(74) *Attorney, Agent, or Firm* — Cantor Colburn LLP

(57) ABSTRACT

An engine oil strainer includes a lubricating oil passage, and an oil inlet and an oil outlet which are respectively disposed at two ends of the lubricating oil passage. The engine oil strainer further includes a check valve which is disposed at the oil inlet and which only allows a lubricating oil to flow into the lubricating oil passage. Also disclosed herein are a lubrication system employing the engine oil strainer, and an internal combustion engine having the lubrication system. When the internal combustion engine stops operating, the lubricating oil flows back from the oil outlet into the engine oil strainer. Since the check valve is disposed at the location of the oil inlet of the engine oil strainer, the lubricating oil (Continued)

flowing back into the engine oil strainer is not capable of proceeding to flow back from the oil inlet into the oil pan.

11 Claims, 3 Drawing Sheets

(51) Int. Cl.
    *F01M 1/02*     (2006.01)
    *F01M 11/03*     (2006.01)
    *F01M 11/04*     (2006.01)

(52) U.S. Cl.
    CPC . *F01M 11/0458* (2013.01); *F01M 2001/0292* (2013.01); *F01M 2001/1078* (2013.01)

(56) References Cited

U.S. PATENT DOCUMENTS

| | | | |
|---|---|---|---|
| 2010/0300958 A1* | 12/2010 | Tawa | F01M 11/00 210/416.5 |
| 2011/0232785 A1* | 9/2011 | Takahashi | F01M 11/0004 137/561 R |
| 2011/0315112 A1 | 12/2011 | Manta et al. | |

FOREIGN PATENT DOCUMENTS

| | | | | |
|---|---|---|---|---|
| CN | 104727888 A | | 6/2015 | |
| CN | 106050356 A | | 10/2016 | |
| CN | 106050357 A | | 10/2016 | |
| DE | 10206268 A1 | | 8/2003 | |
| DE | 102004048138 A1 | | 2/2006 | |
| DE | 102010029830 A1 | * | 12/2011 | ......... B01D 35/0273 |
| FR | 2543615 A1 | | 10/1984 | |
| FR | 3025832 A1 | | 3/2016 | |
| JP | 2000179319 A | | 6/2000 | |
| JP | 2004293376 A | | 10/2004 | |
| JP | 2008267344 A | | 11/2008 | |
| JP | 2008267344 A | * | 11/2008 | |
| KR | 20050032149 A | | 4/2005 | |
| RU | 2064594 C1 | | 7/1996 | |
| RU | 2557148 C2 | | 7/2015 | |
| SU | 1437513 A1 | | 11/1988 | |

OTHER PUBLICATIONS

International Search Report corresponding to Application No. PCT/CN2016/106359; dated May 12, 2017.
EPO Extended Search Report corresponding to ER16913396.4-1007/3498992 dated Feb. 24, 2020.

* cited by examiner

FIG. 3
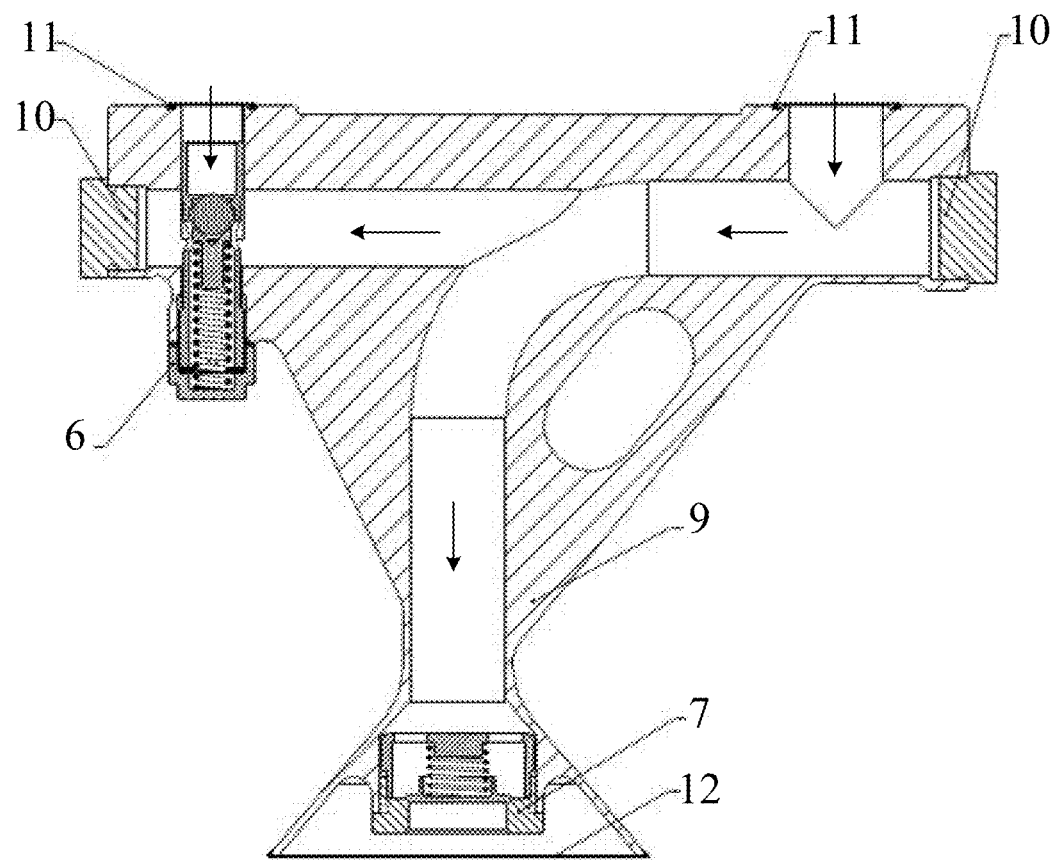
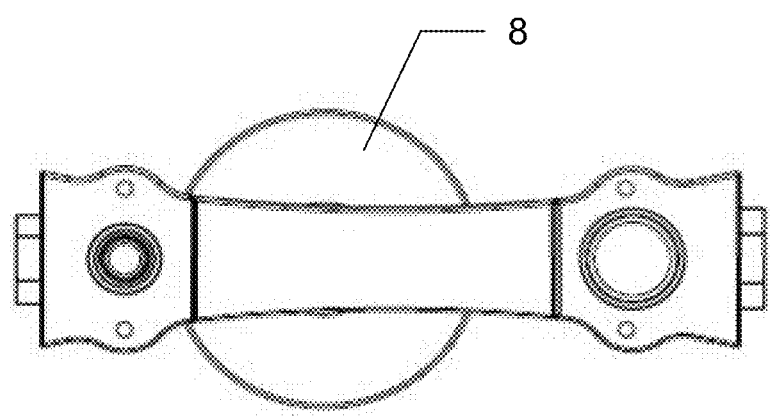
FIG. 4

INTERNAL COMBUSTION ENGINE, LUBRICATION SYSTEM, AND ENGINE OIL STRAINER

CROSS REFERENCE TO RELATED APPLICATIONS

This is the U.S. national stage of application No. PCT/CN2016/106359, filed on Nov. 18, 2016. Priority under 35 U.S.C. § 119(a) and 35 U.S.C. § 365(b) is claimed from Chinese Application No. 201610674143.X, filed Aug. 15, 2016, the disclosures of which are incorporated herein by reference.

FIELD

The present application relates to the field of production technology of internal combustion engines, and particularly to an internal combustion engine, a lubrication system and an oil strainer.

BACKGROUND

It is well known that the internal combustion engine needs the lubricating oil to lubricate each movement pair during operation, to avoid dry friction in each movement pair, thereby ensuring reliable operation of the internal combustion engine.

An oil pan, a lubricating oil passage, an oil pump and an oil strainer provided in front of the oil pump constitute a lubricating system of the internal combustion engine. When the internal combustion engine is in operation, the oil pump pumps the engine oil to the corresponding position for lubrication, and when the internal combustion engine stops, the engine oil is unloaded into the oil pan. When the internal combustion engine resumes operation, the oil pump needs to pump the required lubricating oil from the oil pan into the lubrication position, causing the oil pump to consume more power and requiring a longer time to establish an oil pressure, and especially in the starting stage of the internal combustion engine, it is apt to cause poor lubrication.

Therefore, the technical problem to be solved presently by those skilled in the art is to reduce the power consumed by the oil pump when the internal combustion engine is started, and effectively shorten the time for establishing the oil pressure, so as to sufficiently lubricate the internal combustion engine as quickly as possible.

SUMMARY

One object of the present application is to provide an oil strainer, to reduce the power consumed by an oil pump when an internal combustion engine is started, and effectively shorten the time for establishing an oil pressure, thereby sufficiently lubricating the internal combustion engine as quickly as possible.

Another object of the present application is to provide a lubrication system having the oil strainer.

Yet another object of the present application is to provide an internal combustion engine having the lubrication system.

To achieve the above objects, an oil strainer provided in the present application includes a lubricating oil passage, and an oil inlet and an oil outlet respectively provided at two ends of the lubricating oil passage. The oil strainer further includes a check valve which is arranged at the oil inlet and only allows a lubricating oil to flow into the lubricating oil passage.

Preferably, the oil strainer further includes an oil return pressurized passage, and the oil return pressurized passage has one end in communication with the lubricating oil passage, and another end having an oil return port allowing a returning lubricating oil to flow in.

Preferably, the oil strainer further includes a pressure limiting valve provided at the oil return port, and the pressure limiting valve is configured to open the oil return pressurized passage in a case that a pressure of the returning lubricating oil reaches an opening pressure of the pressure limiting valve.

Preferably, the oil inlet is provided with a frustum-shaped flow guiding portion, and the check valve is embedded in the frustum-shaped flow guiding portion.

Preferably, a housing of the oil strainer is in a shape of a triangle; the housing is drilled to form a first passage and a second passage, the first passage extends through two corners of the housing, and the second passage is drilled from a remaining corner of the housing and is in communication with the first passage, two ends of the first passage are sealed by screw plugs respectively, the oil outlet and the oil return port are respectively opened on a sidewall of the first passage, the lubricating oil passage is defined by the second passage and a section of the first passage adjacent to the oil outlet, and the oil return pressurized passage is defined by a section of the first passage adjacent to the oil return port.

Preferably, the first passage and the second passage are connected by an arc-shaped transition section, and the arc-shaped transition section is bent toward the oil outlet.

The lubricating system in the present application, applicable to an internal combustion engine, includes an oil pump and an engine oil strain according to any one of the above technical solutions, wherein, the oil outlet of the oil strainer is in communication with an inlet of the oil pump; and the oil return port of the oil strainer is in communication with an oil return passage of the internal combustion engine.

Preferably, sealing members are provided between the oil outlet and the inlet of the oil pump, and between the oil return port and a body of the internal combustion engine.

Preferably, the sealing members are sealing gaskets or O-rings.

The lubricating system of the internal combustion engine in the present application employs the lubrication system according to any one of the above technical solutions.

It can be seen from the above technical solutions that the oil strainer in the present application includes a lubricating oil passage, and an oil inlet and an oil outlet which are respectively provided at two ends of the lubricating oil passage. The oil strainer further provides a check valve at the oil inlet, and the check valve only allows a lubricating oil to flow from the oil pan into the lubricating oil passage.

When the internal combustion engine stops, the lubricating oil flow back from the oil outlet into the engine oil strainer. Since the check valve is arranged at the oil inlet of the oil strainer and only allows the lubricating oil to flow into the lubricating oil passage, due to the reverse flow shut-off characteristic of the check valve, the lubricating oil returned into the oil strainer cannot continue to flow back into the oil pan from the oil inlet, and the lubricating oil is temporarily stored in the oil strainer. In this way, the time for establishing an oil pressure is effectively shortened when the internal combustion engine resumes operation, and the lubricating oil can reach the corresponding lubrication positions more rapidly, thereby sufficiently lubricating the internal combustion engine as quickly as possible.

Since the lubricating oil system in the present application employs the above oil strainer, the lubricating oil system also has the advantage of short oil pressure establishing time.

Since the internal combustion engine in the present application employs the above lubrication system, the internal combustion engine has the corresponding advantages of the above lubrication system, which will not be repeated herein.

BRIEF DESCRIPTION OF THE DRAWINGS

FIG. 3 is a schematic view showing the flow direction of the lubricating oil in the oil strainer when the internal combustion engine stops according to an embodiment of the present application; and FIG. 4 is a top view of the oil strainer according to an embodiment of the present application.

REFERENCE NUMERALS

| 1 | lubricating oil passage, | 2 | oil return pressurized passage, |
|---|---|---|---|
| 3 | oil inlet, | 4 | oil outlet, |
| 5 | oil return port, | 6 | pressure limiting valve, |
| 7 | check valve, | 8 | frustum-shaped flow guiding portion, |
| 9 | housing, | 10 | screw plug, |
| 11 | O-ring, | 12 | filter screen. |

DETAILED DESCRIPTION

One core of the present application is to provide an oil strainer, to reduce the power consumed by an oil pump when an internal combustion engine is started, and effectively shorten the time for establishing an oil pressure, thereby sufficiently lubricating the internal combustion engine as quickly as possible.

Another core of the present application is to provide a lubrication system having the oil strainer.

Yet another core of the present application is to provide an internal combustion engine having the lubrication system.

In order to enable the person skilled in the art to better understand the solutions of the present application, the present application will now be illustrated in further detail below in conjunction with the drawings and the specific embodiments.

Figure 1:
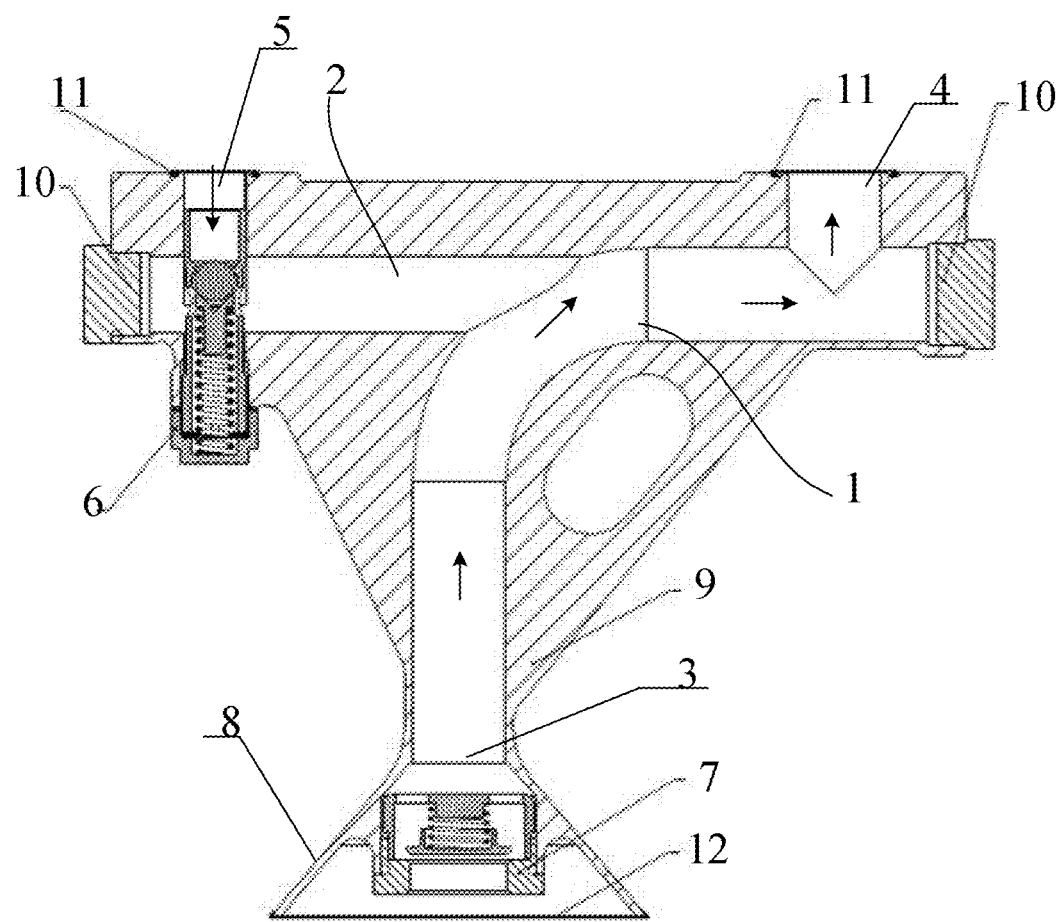
FIG. 1 is a schematic view showing the flow direction of a lubricating oil in an oil strainer in an initial starting stage of an internal combustion engine according to an embodiment of the present application.
Figure 2:
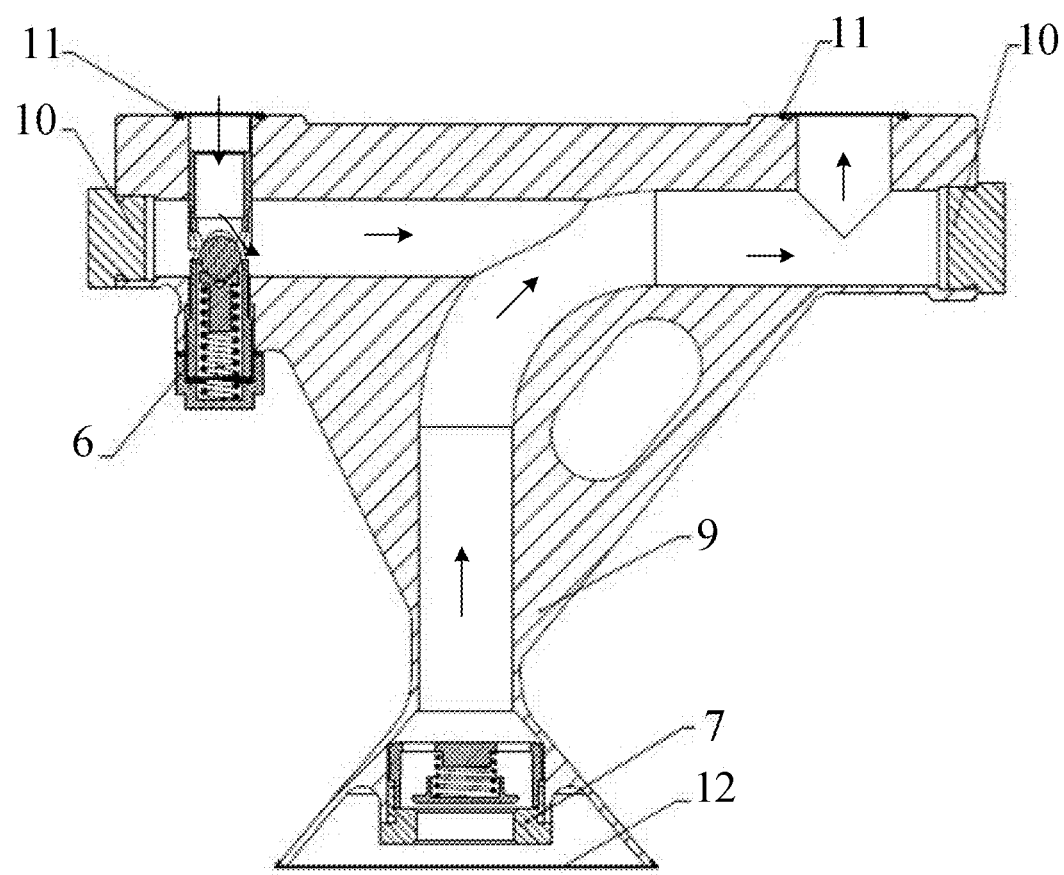
FIG. 2 is a schematic view showing the flow direction of the lubricating oil in the oil strainer when an oil return pressurized passage is opened according to an embodiment of the present application.

Referring to FIG. 1 to FIG. 3, an oil strainer according to this embodiment of the present application includes a lubricating oil passage 1, and an oil inlet 3 and an oil outlet 4 respectively provided at two ends of the lubricating oil passage 1. Compared to the conventional art, the oil strainer in the present application further provides a check valve 7 at the oil inlet 3, and the check valve 7 only allows a lubricating oil to flow into the lubricating oil passage 1 in the oil strainer.

As shown in FIG. 3, when the internal combustion engine stops, the lubricating oil flows back from the oil outlet 4 into the oil strainer. Since the check valve 7 is arranged at the oil inlet 3 of the oil strainer and only allows the lubricating oil to flow into the lubricating oil passage, due to the reverse flow shut-off characteristic of the check valve 7, the lubricating oil returned into the oil strainer cannot continue to flow back into the oil pan from the oil inlet 3, and the lubricating oil is temporarily stored in the oil strainer. In this way, the time for establishing an oil pressure is effectively shortened when the internal combustion engine resumes operation, and the lubricating oil can reach the corresponding lubrication positions more rapidly, thereby sufficiently lubricating the internal combustion engine as quickly as possible.

Of course, a filter screen 12 should be provided at the oil inlet 3. In order to further optimize the technical solutions in the above embodiments, the oil strainer in the present application is further provided with an oil return pressurized passage 2. As shown in FIG. 1 to FIG. 3, the oil return pressurized passage 2 has one end in communication with the lubricating oil passage 1, and another end having an oil return port 5 allowing returning lubricating oil to flow in.

It is not difficult to understand that in the actual working process, the lubricating oil in the oil return pressurized passage 2 will be merged with the lubricating oil flowing into the lubricating oil passage 1 from the oil inlet 3, which effectively increases the flow rate and pressure at the oil outlet 4 of the oil strainer. And since the oil outlet 4 of the oil strainer is in communication with an inlet of an oil pump, the oil strainer can effectively increase the inlet pressure of the oil pump, reduce the power consumption of the oil pump, and improve the fuel economy.

It can be seen that in the embodiments of the present application, the inlet pressure of the oil pump is increased by improving the oil strainer, which avoids the idea of using a variable displacement oil pump with a complicated structure. The purpose of reducing the power consumption of the oil pump has been achieved on the premise of ensuing a simple structure and a low cost.

To effectively increase the inlet pressure of the oil pump, the technical solutions of the above embodiments are further improved in this embodiment. In this embodiment, a pressure limiting valve 6 is further provided at the oil return port 5. As shown in FIG. 1 to FIG. 3, the pressure of the returning lubricating oil reaches an opening pressure of the pressure limiting valve 6, the pressure limiting valve 6 is opened, thereby opening the oil return pressurized passage 2. As shown in FIG. 1, at the initial starting stage of the internal combustion engine, the lubricating oil in the internal combustion engine is still insufficient, at this time, there is no returning lubricating oil at the oil return port 5 or very little returning lubricating oil, and the pressure of the returning lubricating oil is insufficient to open the pressure limiting valve 6, so at this time all the lubricating oil in the oil strainer is from the inlet of the lubricating oil passage 1. As the rotating speed of the internal combustion engine increases, the oil amount pumped by the oil pump is increased, and the oil pressure in a main oil passage of the internal combustion engine is increased accordingly; and when the oil return pressure reaches the opening pressure of the pressure limiting valve 6, excessive lubricating oil in the internal combustion engine flows into the oil return pressurized passage 2 via the oil return port 5, and enters the inlet of the oil pump together with the lubricating oil flowing from the oil inlet 3, as shown in FIG. 2. In this way, the inlet pressure of the oil pump is effectively increased, the outlet pressure of the oil pump is also reduced, the volumetric efficiency of the oil pump is increased, and the power consumption of the oil pump is saved.

As shown in FIG. 1 to FIG. 3, a frustum-shaped flow guiding portion is further provided at the oil inlet 3, to allow the lubricating oil to smoothly enter the lubricating oil passage 1. Of course, the check valve 7 may also be embedded in the frustum-shaped flow guiding portion 8, which makes the structural layout of the whole device more compact and reasonable.

A housing 9 of the oil strainer in the embodiments of the present application is in the shape of a triangle, as shown in FIG. 1 to FIG. 4. The oil passage in the oil strainer is formed in the following manners.

The housing 9 is drilled to form a first passage and a second passage, the first passage extends through two corners of the triangular housing 9, and the second passage is drilled from the third corner to be in communication with the first passage. Two ends of the first passage are sealed by screw plugs 10, and the oil outlet 4 and the oil return port 5 are respectively opened on the sidewall of the housing 9. The lubricating oil passage 1 is defined by the second passage and a section of the first passage adjacent to the oil outlet 4, and the oil return pressurized passage 2 is defined by a section of the first passage adjacent to the oil return port 5. It can be seen that, the oil passage inside the oil strainer may be processed by the machining method, and of cause, the oil passage inside the oil strainer may also be processed by casting.

In order to make full use of the momentum of the lubricating oil itself and avoid a direct impact between two streams of lubricating oil, in this embodiment, the first passage and the second passage are connected by an arc-shaped transition section, as shown in FIG. 1 to FIG. 3, and the arc-shaped transition section is bent toward the oil outlet 4.

A lubricating system in the present application is applied to an internal combustion engine, and includes an oil pump and an oil strain according to any one of the above embodiments. The oil outlet 4 of the oil strainer is in communication with an inlet of the oil pump, and the oil return port 5 of the oil strainer is in communication with an oil return passage of the internal combustion engine.

In the lubrication system, the cooperation between the oil pump and the oil strainer in the above embodiments effectively increases the pressure at the inlet of the oil pump, reduces the power consumption of the oil pump, and improves the fuel economy.

Further, in order to avoid "air sucking condition" or oil leakage of the oil pump, in this embodiment, sealing members are provided between the oil outlet 4 and the inlet of the oil pump, and between the oil return port 5 and the body of the internal combustion engine. The sealing members may have many forms, such as sealing gaskets or sealing rings. In this embodiment, the sealing members are O-rings 11 as shown in FIG. 1 to FIG. 3.

In addition, an internal combustion engine is provided in the present application. The lubrication system of the internal combustion engine employs the lubrication system of the above embodiments. It should be noted that the internal combustion engine includes, but not limited to, a diesel engine and a gasoline engine.

The internal combustion engine also has the advantage of good fuel economy due to employing the above lubrication system.

The internal combustion engine, the lubrication system and the oil strainer according to the present application are described in detail. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An oil strainer, comprising a lubricating oil passage, and an oil inlet and an oil outlet respectively provided at two ends of the lubricating oil passage, and wherein the oil strainer further comprises a check valve which is arranged at the oil inlet and only allows a lubricating oil to flow into the lubricating oil passage;

the oil strainer further comprises an oil return pressurized passage, and the oil return pressurized passage has one end in communication with the lubricating oil passage, and another end having an oil return port allowing a returning lubricating oil to flow in; and wherein a housing of the oil strainer is in a shape of a triangle, the housing is drilled to form a first passage and a second passage, the first passage extends through two corners of the housing, and the second passage is drilled from a remaining corner of the housing and is in communication with the first passage, two ends of the first passage are sealed by screw plugs respectively, the oil outlet and the oil return port are respectively opened on a sidewall of the first passage, the lubricating oil passage is defined by the second passage and a section of the first passage adjacent to the oil outlet, and the oil return pressurized passage is defined by a section of the first passage adjacent to the oil return port, the first passage and the second passage are connected by an arc-shaped transition section, and the arc-shaped transition section is bent toward the oil outlet.

2. The oil strainer according to claim 1, wherein the oil strainer further comprises a pressure limiting valve provided at the oil return port, and the pressure limiting valve is configured to open the oil return pressurized passage in a case that a pressure of the returning lubricating oil reaches an opening pressure of the pressure limiting valve.

3. The oil strainer according to claim 1, wherein a frustum-shaped flow guiding portion is provided at the oil inlet, and the check valve is embedded in the frustum-shaped flow guiding portion.

4. A lubricating system, applicable to an internal combustion engine, comprising an oil pump and the oil strainer according to claim 1, wherein, the oil outlet of the oil strainer is in communication with an inlet of the oil pump; and the oil return port of the oil strainer is in communication with an oil return passage of the internal combustion engine.

5. The lubricating system according to claim 4, wherein sealing members are provided between the oil outlet and the inlet of the oil pump, and between the oil return port and a body of the internal combustion engine.

6. The lubricating system according to claim 5, wherein the sealing members are sealing gaskets or O-rings.

7. An internal combustion engine, comprising the lubrication system according to claim 4.

8. A lubricating system, applicable to an internal combustion engine, comprising an oil pump and the oil strainer according to claim 2, wherein, the oil outlet of the oil strainer is in communication with an inlet of the oil pump; and the oil return port of the oil strainer is in communication with an oil return passage of the internal combustion engine.

9. The lubricating system according to claim 8, wherein sealing members are provided between the oil outlet and the inlet of the oil pump, and between the oil return port and a body of the internal combustion engine.

10. A lubricating system, applicable to an internal combustion engine, comprising an oil pump and the oil strainer according to claim 3, wherein, the oil outlet of the oil strainer is in communication with an inlet of the oil pump; and the oil return port of the oil strainer is in communication with an oil return passage of the internal combustion engine.

11. The lubricating system according to claim 10, wherein sealing members are provided between the oil outlet and the inlet of the oil pump, and between the oil return port and a body of the internal combustion engine.

\* \* \* \* \*